May 27, 1930.   C. M. McCARTHY   1,759,992
MEASURING DEVICE FOR WIRE CLOTH
Filed Nov. 25, 1925
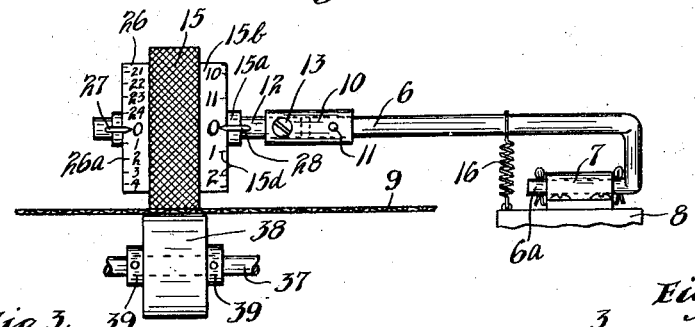
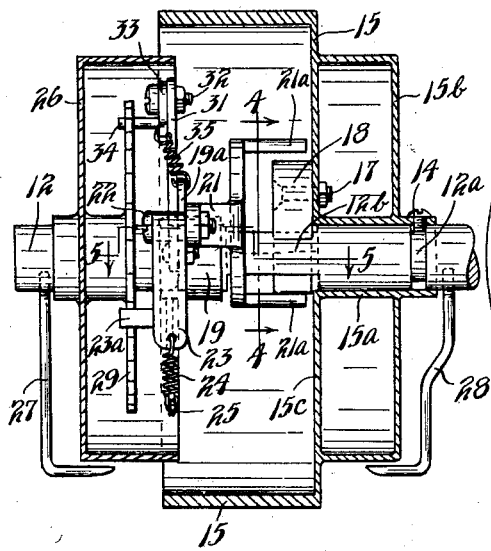
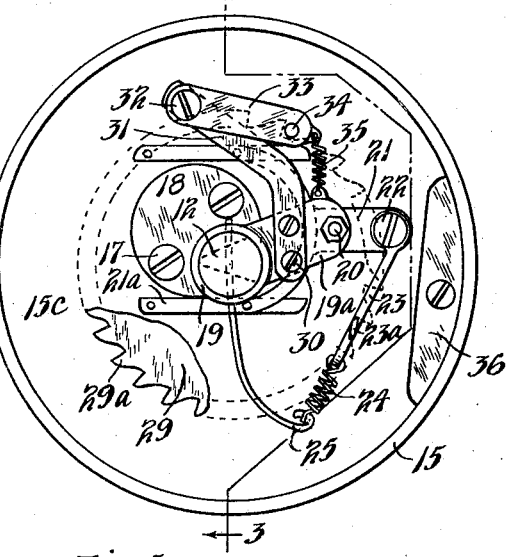
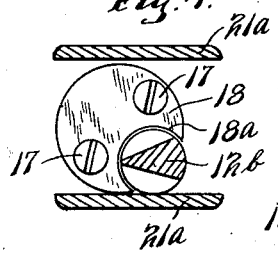
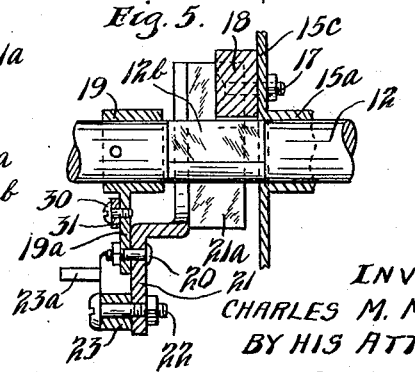
INVENTOR.
CHARLES M. McCARTHY
BY HIS ATTORNEYS.

Patented May 27, 1930

1,759,992

UNITED STATES PATENT OFFICE

CHARLES M. McCARTHY, OF MINNEAPOLIS, MINNESOTA

MEASURING DEVICE FOR WIRE CLOTH

Application filed November 25, 1925. Serial No. 71,365.

This invention relates to a measuring device and particularly to a measuring device for flexible material, particularly flexible sheet material, and while the invention is adapted for measuring any such material, it has been especially used for measuring wire cloth or screen. As is well known to those skilled in the art, various kinds of wire cloth and screen are now sold in many stores. It has heretofore been largely the practice to roll the material out on the floor or counter and measure the same with a yard stick or tape. With the present invention, the material can be unrolled on a cutting table and measured with great accuracy.

It is an object of this invention, therefore, to provide a measuring device having a friction drum between which and an adjacent member the material is traversed to rotate the drum, an indicating wheel being connected to the drum so as to be moved, step by step by the rotation of said drum.

It is also an object of the invention to provide such a measuring device comprising means preventing rotation of said measuring wheel in a reverse direction even though the friction drum is reversely rotated.

It is a further object of the invention to provide a measuring device comprising a friction drum carrying an indicating means, an indicating wheel disposed adjacent said drum adapted to be rotated step by step proportionately to the rotation of said drum, said drum comprising an actuating means for said step by step mechanism.

It is more specifically an object of the invention to provide a measuring device comprising a shaft, a friction drum journaled on said shaft, an indicating wheel adjacent said drum also rotatable about said shaft and having a ratchet disk, oscillatable mechanism pivotally mounted on a member carried on said shaft for rotating said ratchet disk step by step, means on said drum for actuating said oscillating mechanism, and means for preventing rotation of said ratchet disk in a reverse direction.

These and other objects and advantages of the invention will be fully set forth in the following description made in connection with the accompanying drawings in which like reference characters refer to the same parts throughout the different views, and in which, Fig. 1 is a view in front elevation of the device;

Fig. 2 is a view in side elevation with a portion of the device removed;

Fig. 3 is a vertical section taken on the line 3—3 of Fig. 2, as indicated by the arrows;

Fig. 4 is a vertical section taken on the line 4—4 of Fig. 3, as indicated by the arrows; and Fig. 5 is a horiontal section taken on the line 5—5 of Fig. 3, as indicated by the arrows.

Referring to the drawings, a measuring device is shown comprising a shaft 6, which shaft is reversely bent substantially at right angles and has one end portion $6^a$ journaled in a bearing 7 about a substantially horizontal axis, said bearing 7 being secured to a support or table 8 some distance in the rear of the main portion of shaft 6. The main portion of shaft 6 thus projects at one side of bearing 7 so that the measuring device can project over the edge portion of a strip of flexible material, such as a wire screen 9 which may be drawn from a roll over a table or support. The shaft 6 is shown as having a coupling collar 10 at one end secured thereto by a pin 11 having its end projecting to receive the outer end of a shaft 12 which may be held in collar 10 by a set screw 13. The shaft 12 is shown having an annular groove $12^a$ into which projects a small headed screw 14 carried in the end of the hub $15^a$ of a friction drum 15. Said friction drum has a projecting cylindrical portion $15^b$ of smaller diameter on the exterior of which graduations $15^d$ are formed. While these graduations may indicate different distances, according to the size of the device, in practice the device has been used with such indications $15^d$ representing inches. The drum 15 has an interior wall $15^c$ to which is secured by nutted screws 17 having countersunk heads, an eccentric 18, said eccentric being of cylindrical form and having a recess $18^a$ therein fitting about shaft 12, the portion of said shaft embraced by eccentric 18 and adjacent thereto being cut away to have a substantially sector-shaped cross section 12ᵇ, as shown in Fig. 4. Secured to the shaft 12 within drum 15 and at one side of portion 12ᵇ of shaft 12 is a collar 19, which collar has rigidly secured thereto and projecting upwardly and rearwardly therefrom, an arm 19ᵃ. Pivoted adjacent the outer end of arm 19ᵃ by a headed and nutted screw 20, is a yoke 21. The yoke 21 extends to the right, as seen in Fig. 3, from the arm 19ᵃ and is provided with parallel side portions 21ᵃ, which portions 21ᵃ embrace or are disposed at opposite sides of the eccentric 18. The yoke 21 has its other end projecting beyond pivot 20 and has pivoted thereto by the screw 22 a downwardly extending arm 23 having a tooth 23ᵃ projecting laterally therefrom for a purpose to be later described. The lower end of arm 23 is connected to one end of a spring 24, the other end of which is secured to the lower end of a downwardly and laterally curved pin 25 which projects upwardly through shaft 12 and collar 19 and is rigidly held therein. Shaft 12, at one side of the groove 12ᵃ has threaded therein a radially extending pin 28 having its outer end pointed and extending over the periphery of portion 15ᵇ of the drum 15 and forming an indicating pointer for the graduations 15ᵈ. An indicating wheel or drum 26 is also journaled on shaft 12 and is held from longitudinal movement toward drum 15 by the collar 19 and from longitudinal movement away from said drum by a pin 27 secured in shaft 12 extending radially therefrom and having its end pointed and bent to project over the periphery of wheel 26, which periphery is provided with numbered graduations 26ᵃ, said pin 27 thus forming a pointer for said graduations. While the graduations 26ᵃ may be spaced to represent different distances, in practice, the device has been used with these graduations indicating one foot. As shown, in Fig. 3, the wheel 26 is in the form of a cylinder closed at its outer end but open at its inner end, which open end extends a short distance into the open end of the drum 15. Said wheel 26 has a ratchet disk 29 rigidly secured to its hub and the tooth 23ᵃ is adapted to project between and engage with the teeth 29ᵃ of ratchet disk 29, as will be later described. Arm 23, therefore, and its tooth 23ᵃ form a ratchet operating dog. The arm 19ᵃ has rigidly secured thereto by screws 30, a bent arm 31 to the outer end of which is pivoted by the headed and nutted screw 32, a swinging arm 33, the other end of which has projecting therefrom a pin 34 which is also adapted to project between the teeth 29ᵃ of ratchet 29. The arm 33 has a small lug at its end in which is secured one end of a spring 35, the other end of which is secured to a small lug at the upper outer end of arm 19ᵃ. A block or weight 36 is secured to one side of drum 15 adjacent its inner wall to form a counterbalance for the eccentric 18.

In operation, the friction drum 15 is disposed with its axis directly above and parallel with the axis of a shaft 37 having a roller 38 journaled thereon and held in place by collars 39 pinned to said shaft. The roller 38 may be provided with anti-friction bearings, (not shown). The shaft 6 and parts carried thereby, preferably, are urged downwardly by a spring 16 secured to shaft 6 and to support 8 so that friction drum 15 is yieldingly held downward against roller 38.

In operation, when a piece of cloth material 9 is to be measured the drum 15 will be set so that the end of pointer 28 is in alinement with graduation 15ᵈ which is marked zero and the indicating wheel 26 will be set so that the numbered graduation 26ᵃ which is marked zero will be in alinement with pointer 27. The material 9 is disposed between the bottom of the friction drum 15 and the top of roller 38 and said material can be inserted between these parts by raising shaft 6 against the tension of spring 16, or merely pulling the front edge of the material between drum 15 and roller 38. The material is now drawn forwardly and drum 15 is rotated by the lineal travel of the material. As shown in Fig. 1, the periphery of drum 15, preferably, is knurled or roughened so that it will frictionally engage the material. This drum 15 rotates the eccentric 18, which is revolved about shaft 12 and engages the side portions 21ᵃ of yoke 21, so that said yoke is oscillated about its pivot 20. The arm 23ᵃ is raised by the outer end of said yoke against the tension of spring 24 so that tooth 23ᵃ engages a tooth 29ᵃ of the ratchet 29 and moves said ratchet forwardly the distance of one tooth. The pin 34 at this time slides over the curved edge of the adjacent tooth 29ᵃ and clicks or is drawn back along the straight side of the tooth by the spring 35. The arm 33 moving outwardly against the tension of spring 35 allows pin 34 to move past the tooth adjacent the same. The yoke 21 is thus moved to move ratchet disk 29 a distance of one tooth for each rotation of the drum 15. As stated, drum 15 has been, in practice, constructed to have its peripheral circumference equal exactly to one foot and ratchet disk 29 and indicating wheel 26 are thus moved the distance between graduations 26ᵃ for each rotation of drum 15. The numbered indications 26ᵃ, therefore, will indicate the number of feet of the material which have been drawn through between drum 15 and roller 38 and numbered graduations 15ᵈ will indicate the inches of material drawn through after the last movement of wheel 26. After the movement of yoke 21 by the eccentric 18 the yoke and arm 23 will be drawn to normal position by spring 24. The pin 34 prevents any reverse movement of wheel 26 so that after the cloth has been drawn out a certain distance and this distance or length of cloth is indicated on wheel 26, said wheel cannot be reversely moved to indicate a shorter length or distance. If the operator, therefore, after drawing out a certain length of the material, should have his attention diverted, or should stop and engage in conversation, there will be no uncertainty as to the amount of goods dispensed. The indicating wheel 26 will still indicate the amount of goods moved between the rollers and the operator can resume the dispensing of the cloth without any danger of the position of the wheel 26 having been changed. The non-reversible feature of this wheel therefore forms a valuable safety feature. It is also obvious that the machine can be used to measure tape or other flexible material, such as rope.

It is also obvious that applicant's shaft 6 and drum 15 can be moved along the material to measure the same.

From the above description it is seen that applicant has provided a very simple and very accurate and efficient measuring device. In practice, the roller 38 is made to run very freely so that there is no slipping of the cloth relatively to the drum 15. In a test made by the State of Minnesota, the device showed an error of one eighth of one inch in 210 feet of wire cloth measured. The structure is extremely simple and the device can be easily and inexpensively produced. The same has been amply demonstrated in actual practice and has been very successful in commercial use.

It will, of course, be understood, that various changes may be made in the form, details, arrangement and proportions of the parts without departing from the scope of applicant's invention, which, generally stated, consists in a device capable of carrying out the objects above set forth, in the novel parts and combinations of parts disclosed and defined in the appended claims.

What is claimed is:

1. A measuring device for flexible material having in combination, a shaft, a friction drum journaled on said shaft, an indicator wheel rotatable about said shaft, a ratchet disk secured to said wheel, a member oscillatable about a fixed axis and supported by said shaft, means movable by said drum operatively connected to said member, a dog for moving said ratchet disk carried by said member, a spring fixed at one end and connected at its other end to said dog, a resiliently controlled ratchet engaging means for preventing movement of said ratchet disk in a reverse direction, and means adjacent said drum and between which and said drum the material is moved for rotating said drum.

2. A measuring device for flexible material having in combination, a shaft, a friction drum journaled on said shaft, and adapted to have its peripheral surface move in contact with the material to be measured, an indicator wheel rotatable about said shaft, a ratchet member carried by said wheel, an arm rigidly carried by said shaft, a yoke pivoted to said arm, an eccentric on said drum embraced by said yoke for moving said yoke, a ratchet member engaging dog carried by said yoke for moving said ratchet in one direction, resilient means connected to said dog and secured to said shaft, and means for preventing movement of said ratchet member, and wheel in a reverse direction.

3. The structure set forth in claim 2, said last mentioned means including a ratchet-engaging member, a pivoted arm carrying said member and resilient means moving said member toward said ratchet.

4. A measuring device for flexible material having in combination, a shaft, a friction drum journaled on said shaft adapted to have its peripheral surface moved by contact with the material to be measured, a cylindrical member of smaller diameter than said drum rigid therewith and carried thereby at one side thereof having indications on its periphery indicating units of material passing and engaging said drum, a second drum journaled on said shaft and rotatable thereon independently of said first mentioned drum having indications on its periphery indicating larger units of material measured, a step by step propelling mechanism for said second drum disposed within said drums, means movable by revolution of said first mentioned drum for actuating said mechanism and pointers cooperating respectively with said indications.

5. A measuring device for flexible material having in combination, a stationary shaft, a drum journaled for rotation on said shaft and adapted to have its peripheral surface moved in contact with the material to be measured, said drum having an open side, an indicator drum journaled on said shaft and having an open side facing the open side of said first mentioned drum, thus forming a casing, said indicator drum having indications on its periphery, means within said casing movable by said first mentioned drum to rotate said indicator drum one step for each complete rotation of said first mentioned drum.

6. A measuring device for flexible material, having in combination, a shaft, a drum journaled for rotation thereon adapted to have its peripheral surface moved in contact with the material to be measured, said drum having a closed side and an open side, and having a cylindrical portion at one side thereof and of smaller diameter than said drum, having graduations on its periphery, an indicator drum journaled on said shaft having an open side facing the open side of said first mentioned drum extending slightly thereinto thus forming a casing, means within said casing for moving said indicator drum one step for each revolution of said first mentioned drum, a pointer carried by said shaft cooperating with said graduations and a pointer carried by said shaft cooperating with the indications on said indicator drum.

In testimony whereof I affix my signature.

CHARLES M. McCARTHY.